United States Patent
Van Baar et al.

(10) Patent No.: US 7,141,527 B1
(45) Date of Patent: Nov. 28, 2006

(54) CATALYST SYSTEM AND PROCESS FOR THE POLYMERIZATION OF OLEFINS

(75) Inventors: Jan F. Van Baar, Amsterdam (NL);
Andrew D. Horton, Amsterdam (NL);
Gerard M. M. Van Kessel,
Geldermalsen (NL); Eric Kragtwijk,
Amsterdam (NL); Max Van De Pas,
Rotterdam (NL); Peter A. Schut,
Almere (NL); Johan Stapersma,
Castricum (NL)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/088,408

(22) PCT Filed: Sep. 15, 2000

(86) PCT No.: PCT/EP00/09111

§ 371 (c)(1),
(2), (4) Date: Mar. 19, 2002

(87) PCT Pub. No.: WO01/21674

PCT Pub. Date: Mar. 29, 2001

(30) Foreign Application Priority Data

Sep. 22, 1999 (EP) .................................. 99203110

(51) Int. Cl.
*C08F 4/6392* (2006.01)
*C07F 5/06* (2006.01)

(52) U.S. Cl. .................. 502/154; 502/103; 502/152; 502/414; 526/165; 526/160; 526/348; 526/352; 526/943; 556/170; 556/179

(58) Field of Classification Search ................ 556/179, 556/170; 502/103, 125, 152, 414, 154; 526/165, 526/348, 352, 160, 943
See application file for complete search history.

(56) References Cited

U.S. PATENT DOCUMENTS

| | | | |
|---|---|---|---|
| 5,087,677 A | 2/1992 | Brekner et al. | 526/160 |
| 5,145,819 A | 9/1992 | Winter et al. | 502/117 |
| 5,324,800 A | 6/1994 | Welborn, Jr. et al. | 526/160 |
| 5,422,409 A | 6/1995 | Brekner et al. | 526/281 |
| 5,455,366 A | 10/1995 | Rohrmann et al. | 556/8 |
| 5,849,653 A * | 12/1998 | Dall'Occo et al. | 502/117 |
| 6,136,932 A * | 10/2000 | Dall'occo et al. | 526/160 |
| 6,232,484 B1 * | 5/2001 | Schaverien et al. | 556/53 |
| 6,635,779 B1 * | 10/2003 | Ewen et al. | 556/11 |

FOREIGN PATENT DOCUMENTS

| | | |
|---|---|---|
| EP | 0129368 | 12/1984 |
| EP | 0407870 | 1/1991 |
| EP | 0416815 | 3/1991 |
| EP | 0420436 | 4/1991 |
| EP | 0485823 | 5/1992 |
| EP | 0501370 | 9/1992 |
| EP | 0575875 | 12/1993 |
| EP | 0643066 | 3/1995 |
| EP | 0671404 | 9/1995 |
| WO | 9104257 | 4/1991 |
| WO | 9602580 | 2/1996 |
| WO | 9822486 | 5/1998 |
| WO | 9843989 | 10/1998 |
| WO | 9921896 | 5/1999 |
| WO | 9921899 | 5/1999 |
| WO | 9924446 | 5/1999 |

OTHER PUBLICATIONS

Ziegler et al., 'Aluminiumtrialkyle und Dialkyl-Aluminiumhydride aus Aluminiumisobutyl-Verbindungen.' Liebigs Ann. Chem. (1960), 629, pp. 14-19.

* cited by examiner

*Primary Examiner*—Caixia Lu
(74) *Attorney, Agent, or Firm*—Jarrod N Raphael; William R Reid

(57) ABSTRACT

A catalyst system for the polymerization of olefins comprising the product obtained by contacting:
(A) a metallocene complex;
(B) an organometallic aluminium compound of formula (II):

$$Al[CH_2-C(Ar)R^4R^5]_xH_y \quad \text{(II)}$$

wherein Ar is a substituted or unsubstituted aryl group having from 6 to 20 carbon atoms; $R^4$ is a linear or branched, saturated or unsaturated, $C_1$–$C_{10}$ alkyl, $C_6$–$C_{20}$ aryl, $C_7$–$C_{20}$ arylalkyl or $C_7$–$C_{20}$ alkylaryl; $R^5$ is hydrogen or a linear or branched, saturated or unsaturated, $C_1$–$C_{10}$ alkyl, $C_6$–$C_{20}$ aryl, $C_7$–$C_{20}$ arylalkyl or $C_7$–$C_{13}$ alkylaryl group;
x=2 or 3; y=3-x; and
water;
the molar ratio (B)/(C) being between 1:1 and 100:1. These catalysts show an improved activity with respect to known catalysts, wherein different aluminium compounds are used.

23 Claims, No Drawings

CATALYST SYSTEM AND PROCESS FOR THE POLYMERIZATION OF OLEFINS

This application is the U.S. national phase of International Application PCT/EP00/09111, filed Sep. 15, 2000.

FIELD OF THE INVENTION

The present invention relates to a high activity catalyst system for the polymerization of olefins comprising the reaction product of a metallocene complex, a specific organometallic aluminium compound and water.

The invention also relates to a processes for the polymerization of olefins carried out in the presence of said catalyst system.

PRIOR ART DISCLOSURE

Homogeneous catalytic systems based on metallocene complexes activated by alumoxanes are known to be active in the polymerization of olefins since mid-1980s; the class of alkylalumoxanes, commonly obtained by reacting trialkylaluminium compound and water in a molar ratio of 1:1 to 100:1, comprises oligomeric linear and/or cyclic alumoxanes represented by the formulae:

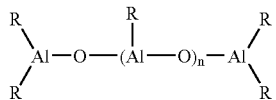

for linear oligomeric alumoxanes, and

for cyclic oligomeric alumoxanes, wherein the substituents R can be alkyl, alkenyl or alkylaryl radicals, having 1–20 and preferably 1–8 carbon atoms, n ranges from 1 to 40, preferably from 10 to 20, and m ranges from 3 to 40, preferably from 3 to 20.

In the most widely used alumoxanes, the R substituents are methyl, ethyl or isobutyl groups; methylalumoxane is the most common cocatalyst in metallocene catalyst systems.

Nevertheless alkylalumoxanes, and in particular methylalumoxane, though very active in metallocene-based catalyst systems, exhibit several inherent problems in use, such as the need for high alumoxane/metallocene molar ratios to produce satisfactory catalytic activities, their high reactivity toward impurities (moisture, alcohols etc.) and their easy flammability; accordingly, some of the developments in this area involved a search for alternative cocatalysts.

EP-A-0,575,875, in the name of the same Applicant, describes homogeneous catalytic systems for the polymerization of olefins comprising the product obtained by contacting a metallocene complex of Ti, Zr or Hf, an organometallic aluminium compound wherein at least one alkyl is different from a straight alkyl, and water; in the working examples, said organometallic aluminium compound is triisobutylaluminum or triisohexylaluminium.

WO 96/02580, in the name of the same Applicant, describes improved catalytic systems comprising a metallocene compound and the product obtained by contacting water and an organometallic aluminium compound of formula:

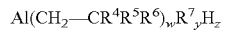

wherein $R^4$ is a $C_1$–$C_{10}$ alkyl, alkenyl or arylalkyl group; $R^5$ is a $C_3$–$C_{50}$ hydrocarbon different from a straight alkyl or alkenyl group; $R^6$ is hydrogen or a $C_1$–$C_{10}$ hydrocarbon group; $R^7$ is a $C_1$–$C_{10}$ hydrocarbon group; w is 1–3; z is 0 or 1; and y=3-w-z.

WO 99/21899, in the name of the same Applicant, describes a catalyst system for olefin polymerization comprising a metallocene compound activated by the product obtained by contacting water and an organometallic aluminium compound of formula:

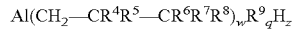

wherein $R^4$ is a $C_1$–$C_{10}$ alkyl or $C_7$–$C_{20}$ arylalkyl group; $R^5$ is hydrogen, a $C_1$–$C_{10}$ alkyl or a $C_7$–$C_{10}$ arylalkyl group; $R^6$ and $R^7$ are $C_1$–$C_{10}$ hydrocarbon groups; $R^8$ is hydrogen or a $C_1$–$C_{10}$ hydrocarbon group; $R^9$ is a $C_1$–$C_{10}$ alkyl or $C_7$–$C_{10}$ arylalkyl group; w is 1–3; z is 0 or 1; and q=3-w-z. Said organometallic aluminium compounds are characterized by presenting one or more ($CH_2$—$CR^4R^5$—$CR^6R^7R^8$) groups, which are alkyl groups substituted in beta and gamma positions; illustrative examples of these compounds are tris(2,3-dimethyl-hexyl)aluminium, tris(2,3,3,-trimethyl-butyl)aluminium, tris(2-methyl-3-ethyl-pentyl)aluminium and tris(2-ethyl-3-methyl-pentyl)aluminium.

However, the catalysts described in the above-cited patent applications exert activities in the polymerization of olefins which are not completely satisfactory in all the applications. Therefore, the problem addressed by the present invention is to further improve the activities of the above-discussed known catalysts.

To solve this problem, novel catalysts have unexpectedly been found which are suitable for the polymerization of olefins and possess a considerably improved activity compared with the known catalysts.

SUMMARY OF THE INVENTION

The Applicant has now found a catalyst system for the polymerization of olefins comprising the product obtained by contacting the following components:

(A) a metallocene complex of formula (I):

wherein $(ZR^1_m)_n$ is a divalent group bridging Cp and A, Z being C, Si, Ge, N or P, and the $R^1$ groups, equal or different from each other, being hydrogen or linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl groups;

Cp is a substituted or unsubstituted cyclopentadienyl group, optionally condensed to one or more substituted or unsubstituted, saturated, unsaturated or aromatic rings, containing from 4 to 6 carbon atoms, optionally containing one or more heteroatoms;

A is —O—, —S—, —N($R^2$)—, wherein $R^2$ is hydrogen, a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl, or A has the same meaning of Cp;

M is a transition metal belonging to group 3, 4, 5, 6 or to the lanthanide or actinide groups of the Periodic Table of the Elements (IUPAC version);

the substituents L, same or different from each other, are monoanionic sigma ligands selected from the group consisting of hydrogen, halogen, —$R^3$, —$OR^3$, —$OCOR^3$, —$SR^3$, —$NR^3_2$ and —$PR^3_2$, wherein $R^3$ is a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl group, optionally containing one or more Si or Ge atoms; preferably, the substituents L are the same;

m is 1 or 2, and more specifically it is 1 when Z is N or P, and it is 2 when Z is C, Si or Ge;

n is an integer ranging from 0 to 4;

r is 0 or 1; n is 0 when r is 0;

p is an integer equal to the oxidation state of the metal M minus 2 when r=1, and minus 1 when r=0, and ranges from 1 to 4;

(B) an organometallic aluminum compound of formula (II):

$$Al[CH_2-C(Ar)R^4R^5]_xH_y \qquad (II)$$

wherein

Ar is a substituted or unsubstituted aryl group having from 6 to 20 carbon atoms;

$R^4$ is a linear or branched, saturated or unsaturated, $C_1$–$C_{10}$ alkyl, $C_6$–$C_{20}$ aryl, $C_7$–$C_{20}$ arylalkyl or $C_7$–$C_{20}$ alkylaryl; $R^5$ is hydrogen or a linear or branched, saturated or unsaturated, $C_1$–$C_{10}$ alkyl, $C_6$–$C_{20}$ aryl, $C_7$–$C_{20}$ arylalkyl or $C_7$–$C_{20}$ alkylaryl group; the substituents $R^4$ and $R^5$ optionally form a ring, having 3 to 8 carbon atoms;

a carbon atom in the compound of formula (II) being optionally replaced by a Si or a Ge atom;

x is 2 or 3; y=3-x; and water;

the molar ratio between the organometallic aluminium compound (B) and water (C) being comprised between 1:1 and 100:1,

DETAILED DESCRIPTION OF THE INVENTION

In the catalyst system according to the invention, the molar ratio between the organometallic aluminium compound (B) and water (C) is comprised between 1:1 to 100:1, and preferably between 1:1 and 50:1. A suitable value for the Al/$H_2O$ molar ratio is about 2.

The molar ratio between the organometallic aluminium compound (B) and the metallocene complex (A), calculated as Al/M molar ratio, preferably ranges from 50 to 50000, and more preferably from 500 to 5000.

In the metallocene complex (A) of formula (I), the divalent bridge $(ZR^1_m)_n$ is preferably selected from the group consisting of $CR^1_2$, $(CR^1_2)_2$, $(CR^1_2)_3$, $SiR^1_2$, $GeR^1_2$, $NR^1$ and $PR^1$, $R^1$ having the meaning reported above; more preferably, said divalent bridge is $Si(CH_3)_2$, $SiPh_2$, $CH_2$, $(CH_2)_2$, $(CH_2)_3$ or $C(CH_3)_2$.

The variable m is 1 or 2; the variable n ranges from 0 to 4 and, when n>1, the atoms Z can be the same or different from each other, such as in divalent bridges —$CH_2$—O—, —$CH_2$—S— and —$CH_2$—Si($CH_3$)$_2$—.

The ligand Cp, which is π-bonded to said metal M, is preferably selected from the group consisting of cyclopentadienyl, mono-, di-, tri- and tetra-methyl cyclopentadienyl; 4-$^t$butyl-cyclopentadienyl; 4-adamantyl-cyclopentadienyl; indenyl; mono-, di-, tri- and tetra-methyl indenyl; 3-$^t$butyl-indenyl; 3-trimethylsilyl-indenyl; 4,5,6,7-tetrahydroindenyl; fluorenyl; 5,10-dihydroindeno]1,2-b]indol-10-yl; N-methyl- or N-phenyl-5,10-kihydroindeno [1,2-b]indol-10-yl; 5,6-dihydroindeno[2,1-b]indol-6-yl; N-methyl-or N-phenyl-5,6-dihydroindeno[2,1-b]indol-6-yl; azapentalene-4-yl; thiapentalene-4-yl; azapentalene-6-yl; thiapentalene-6-yl; mono-, di- and tri-methyl-azapentalene-4-yl.

The group A is —O—, —S—, —N($R^2$)—, wherein $R^2$ is hydrogen, a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl, or A has the same meaning of Cp.

When A is —N($R^2$)—, a suitable class of metallocene complexes (A) for use in the catalysts complexes of the invention comprises the well-known constrained geometry catalysts, as described in EP-A-0 416 815, EP-A-0 420 436, EP-A-0 671 404, EP-A-0 643 066 and WO 91/04257.

According to a preferred embodiment of the invention, the group A has the same meaning of Cp, and it is preferably cyclopentadienyl, indenyl or tetrahydroindenyl.

Suitable metallocene complexes (A) that may be used in the catalysts system according to the present invention are described in U.S. Pat. No. 5,324,800 and EP-A-0 129 368.

The metal M is preferably Ti, Zr or Hf, and more preferably Zr.

The substituents L are preferably the same and are selected from the group consisting of halogens, $R^3$, —$OR^3$ and —$NR^3_2$; wherein $R^3$ is a $C_1$–$C_7$ alkyl, $C_6$–$C_{14}$ aryl or $C_7$–$C_{14}$ arylalkyl group, optionally containing one or more Si or Ge atoms; more preferably, the substituents L are selected from the group consisting of —Cl, —Br, —Me, —Et, —n—Bu, —sec—Bu, —Ph, —Bz, —$CH_2SiMe_3$, —OEt, —OPr, —OBu, —OBz and —$NMe_2$.

The integer n ranges from 0 to 4, and it is preferably 1 or 2.

When n=0 and r=1, A can have only the meaning of Cp; Cp and A are preferably pentamethyl cyclopentadienyl, indenyl or 4,5,6,7-tetrahydroindenyl groups.

Non-limiting examples of these metallocene complexes are:

| | | |
|---|---|---|
| ($Me_3Cp$)$_2MCl_2$ | ($Me_4Cp$)$_2MCl_2$ | ($Me_5Cp$)$_2MCl_2$ |
| ($EtMe_4Cp$)$_2MCl_2$ | [($C_6H_5$)$Me_4Cp$]$_2MCl_2$ | ($Et_5Cp$)$_2MCl_2$ |
| ($Ind$)$_2MCl_2$ | ($H_4Ind$)$_2MCl_2$ | ($Me_4Cp$)($Me_5Cp$)$MCl_2$ |
| [$Si(CH_3)_3Cp$]$_2MCl_2$ | ($Me_5Cp$)$MCl_3$ | ($Ind$)$MCl_3$ and |
| ($H_4Ind$)$MCl_3$ | | | and the corresponding —$MMe_2$, —$M(OMe)_2$, —$M(OEt)_2$, —$MCl(OMe)$, —$MCl(OEt)$, —$MPh_2$, —$MBz_2$, —$MMeCl$, —$MPhCl$, —$M(NMe_2)_2$ and —$M(NMe_2)OMe$ derivatives, wherein Me=methyl, Et=ethyl, Cp=cyclopentadienyl, Ind=indenyl, $H_4Ind$=4,5,6,7-tetrahydroindenyl, Ph=phenyl, Bz=benzyl, and M is preferably Zr.

When n=1 or 2 and r=1, Cp and A, same or different from each other, are preferably cyclopentadienyl, tetramethylcyclopentadienyl, indenyl, 4,5,6,7-tetrahydroindenyl, 2-methyl-4,5,6,7-tetrahydroindenyl, 4,7- dimethyl-4,5,6,7-tetrahydroindenyl, 2,4,7-trimethyl-4,5,6,7-tetra-hydroindenyl or fluorenyl groups; $(ZR^1_m)_n$ is preferably $Me_2Si$, $Me_2C$, $Ch_2$ or $C_2H_4$. Non-limiting examples of metallocene complexes of formula (I), wherein n=1 or 2 and r=1, are:

| | | |
|---|---|---|
| Me$_3$Si(Me$_4$Cp)$_2$MCl$_2$ | Me$_2$C(Me$_4$Cp)(MeCp)MCl$_2$ | Me$_2$Si(Ind)$_2$MCl$_2$ |
| C$_2$H$_4$(Ind)$_2$MCl$_2$ | C$_2$H$_4$(H$_4$Ind)$_2$MCl$_2$ | Ph(Me)Si(Ind)$_2$MCl$_2$ |
| Ph$_2$Si(Ind)$_2$MCl$_2$ | Me$_2$C(Flu)(Cp)MCl$_2$ | |
| C$_2$H$_4$(Me$_4$Cp)$_2$MCl$_2$ | C$_2$Me$_4$(Ind)$_2$MCl$_2$ | Me$_2$SiCH$_2$(Ind)$_2$MCl$_2$ |
| C$_2$H$_4$(2-MeInd)$_2$MCl$_2$ | C$_2$H$_4$(3 -MeInd)$_2$MCl$_2$ | C$_2$H$_4$(4,7-Me$_2$Ind)$_2$MCl$_2$ |
| C$_2$H$_4$(5,6-Me$_2$Ind)$_2$MCl$_2$ | C$_2$H$_4$(2-MeH$_4$Ind)$_2$MCl$_2$ | C$_2$H$_4$(2,4,7-Me$_3$H$_4$Ind)$_2$MCl$_2$ |
| C$_2$H$_4$(4,7-Me$_2$H$_4$Ind)$_2$MCl$_2$ | C$_2$H$_4$(2,4,7-Me$_3$Ind)$_2$MCl$_2$ | C$_2$H$_4$(2-Me-Benz[e]Ind)$_2$MCl$_2$ |
| C$_2$H$_4$(Benz[e]Ind)$_2$MCl$_2$ | Me$_2$Si(2-MeInd)$_2$MCl$_2$ | Me$_2$Si(4,7-Me$_2$Ind)$_2$MCl$_2$ |
| Me$_2$Si(2-Me-4-Ph-Ind)$_2$MCl$_2$ | Me$_2$Si(5,6-Me$_2$Ind)$_2$MCl$_2$ | Me$_2$Si(2,4,7-Me$_3$Ind)$_2$MCl$_2$ |
| Me$_2$Si(2-MeH$_4$Ind)$_2$MCl$_2$ | Me$_2$Si(4,7-Me$_2$H$_4$Ind)$_2$MCl$_2$ | Me$_2$Si(2,4,7-Me$_3$H$_4$Ind)$_2$MCl$_2$ |
| Me$_2$Si(Benz[e]Ind)$_2$MCl$_2$ | Me$_2$Si(2-Me-Benz[e]Ind)$_2$MCl$_2$ | Me$_2$C(Ind)$_2$MCl$_2$ |
| Me$_2$C(3-Me-Ind)$_2$MCl$_2$ | Me$_2$C(3-iPr-Ind)$_2$MCl$_2$ | Me$_2$C(3-Me$_3$Si-Ind)$_2$MCl$_2$ |
| Me$_2$C(3-tBu-Ind)$_2$MCl$_2$ | Me$_2$C(3-tBu-H$_4$Ind)$_2$MCl$_2$ | Me$_2$C(3-tBu-Cp)$_2$MCl$_2$ |
| Me$_2$C(2-Me-4-tBu-Cp)$_2$MCl$_2$ | H$_2$C(3-tBu-Ind)$_2$MCl$_2$ | H$_2$C(3-iPr-Ind)$_2$MCl$_2$ |
| H$_2$C(3-Me$_3$Si-Ind)$_2$MCl$_2$ | H$_2$C(4,7-Me$_2$Ind)$_2$MCl$_2$ | H$_2$C(1-Ph-5,7-Me$_2$Ind)$_2$MCl$_2$ |
| H$_2$C(2-Me-Ind)$_2$MCl$_2$ | H$_2$C(2-Me-3-Me$_3$Si-Ind)$_2$MCl$_2$ | H$_2$C(Ind)$_2$MCl$_2$ | and the corresponding —MMe$_2$, —M(OMe)$_2$, —M(OEt)$_2$, —MCl(OMe), —MCl(OEt), —MPh$_2$, —MBz$_2$, —MMeCl, —MPhCl, —M(NMe$_2$)$_2$ and —M(NMe$_2$)OMe derivatives, wherein Me, Cp, Ind, Flu, Ph, Bz, H$_4$Ind and M has the meanings reported above.

Suitable metallocene complexes (A) are the bridged bis-indenyl metallocenes as described for instance in U.S. Pat. No. 5,145,819 and EP-A-0 485 823.

Further metallocene complexes suitable for the catalyst system of the invention are the classes of hetercyclic metallocenes described in WO 98/22486 and WO 99/24446. Among these metallocenes, particularly preferred are the ones reported from page 15, line 8 to page 24, line 17; from page 25, line 1 to page 31, line 9; and from page 58, penultimate line, to page 63, line 20 of WO 98/22486. Other preferred metallocenes are the ones obtained from the bridged ligands listed from page 11, line 18, to page 14, line 13 of WO 99/24446

In the organometallic aluminium compounds (B) of formula (II), Ar is a substituted or unsubstituted aryl group having from 6 to 20 carbon atoms; said aryl group has preferably formula (III):

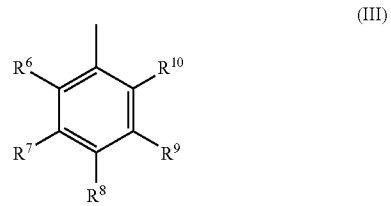

(III)

wherein R$^6$, R$^8$ and R$^{10}$ are selected from the group consisting of hydrogen, halogen, —R$^3$, —C(O)R$^3$, —OR$^3$, —SR$^3$ —NR$^3{}_2$ and —NO$_2$, wherein R$^3$ has the meaning given above; and the groups R$^7$ and R$^9$ are selected from the group consisting of hydrogen, halogen, linear or branched, saturated or unsaturated C$_1$–C$_{20}$ alkyl, C$_3$–C$_{20}$ cycloalkyl, C$_6$–C$_{20}$ aryl, C$_7$–C$_{20}$ alkylaryl and C$_7$–C$_{20}$ arylalkyl groups, optionally containing one or more Si or Ge atoms; two adjacent substituents R$^6$–R$^{10}$ optionally form a ring, having 3 to 8 carbon atoms.

According to a particularly preferred embodiment of the invention, Ar is selected from the group consisting of 4-fluoro-phenyl, 4-chloro-phenyl, 4-methoxyphenyl, 4-nitrophenyl, 3-methylphenyl, 3-isopropylphenyl, 2,4-difluorophenyl, 2,4-dicholorphenyl, 2,6-difluorophenyl, 2,6-dichlorophenyl, 3,5-difluorophenyl, 3,5-dicholophenyl, 2,4,6-trifluorophenyl, 2,4,6-trichlorophenyl, 3,4,5-trifluorophenyl, 3,4,5-trichlorophenyl, pentafluorophenyl and pentachlorophenyl.

In the organometallic aluminium compound of formula (II), R$^4$ is preferably a C$_1$–C$_5$ alkyl group, more preferably a C$_1$–C$_3$ alkyl group, and even more preferably is methyl or ethyl; R$^5$ is preferably hydrogen or a C$_1$–C$_5$ alkyl group, more preferably hydrogen or a C$_1$–C$_3$ alkyl group, and even more preferably is hydrogen, methyl or ethyl; x is 2 or 3, and preferably is 3.

According to the invention, component (B) can suitably comprise a mixture of two or more organometallic aluminium compounds of formula (II). Moreover, Component (B) can be used in combination with other organometallic aluminium compounds, different from those of formula (II), or in mixture with other compatible cocatalysts known in the state of the art.

In the organometallic aluminium compounds of formula (II), y is 0 or 1. As it is known in the state of the art, aluminium trialkyls may contain small amounts of bisalkyl-aluminium hydride, the hydride content can slightly change during prolonged storage periods and depending on the storage temperature. Therefore, according to a preferred embodiment of the invention, component (B) is a mixture of the two organometallic aluminium compounds of formula (II) wherein y32 0 and y=1; said mixtures of organometallic aluminium compounds may be prepared with methods known in the state of the art.

Non-limiting examples of organometallic aluminium compounds (B) of formula (II), according to the present invention, are:

tris(2-phenyl-propyl)aluminium,
tris[2-(4-fluoro-phenyl)-propyl]aluminium,
tris[2-(4-chloro-phenyl)-propyl]aluminium,
tris[2-(3-isopropyl-phenyl)-propyl]aluminium,
tris(2-phenyl-butyl)aluminium,
tris(3-methyl-2-phenyl-butyl)aluminium,
tris(2-phenyl-pentyl)aluminium,
tris[2-(pentafluorophenyl)-propyl]aluminium
tris[2,2-diphenyl-ethyl]aluminium
tris[2-phenyl-2-methyl-propyl]aluminium as well as the corresponding compounds wherein one of the hydrocarbyl groups is replaced by a hydrogen atom. Particularly preferred compounds are tris(2-phenyl-propyl)aluminium, tris[2-(4-fluoro-phenyl)-propyl]aluminium and tris[2-(4-chloro-phenyl)-propyl]aluminium.

The components of the catalysts of the present invention can be brought into contact in different ways. It is possible for instance, to contact first the aluminium compound (B) with water (C) and subsequently to bring the thus obtained reaction product into contact with the metallocene complex (A).

Therefore, a preferred embodiment of the present invention is a catalyst system for the polymerization of olefins comprising the product obtained by contacting the following components:
(A) a metallocene complex of formula (I):

$$(Cp)(ZR^1{}_m)_n(A)_rML_p \tag{I}$$

wherein M, Cp, $(ZR^1{}_m)_n$, A, L, r and p have the meanings reported above; and
(B') the product of the reaction between water and an organometallic aluminium compound of formula (II):

$$Al[CH_2-C(Ar)R^4R^5]_xH_y \tag{II}$$

wherein Ar, $R^4$, $R^5$, x and y have the meanings reported above.

The molar ratio between said organometallic aluminium compound and said water preferably ranges from 1:1 to 100:1; more preferably from 1:1 to 50:1; even more preferably, the Al/H$_2$O molar ratio is 2. The expression "product of reaction" means the product obtained by contacting the above-mentioned components.

The molar ratio between said organometallic aluminium compound and said metallocene complex, expressed as Al/M molar ration, preferably ranges from 50 to 50000, more preferably from 500 to 5000.

A further object of the present invention is an alumoxane obtained by contacting an organometallic aluminium compound of formula (II):

$$Al[CH_2-C(Ar)R^4R^5]_xH_y \tag{II}$$

wherein Ar, $R^4$, $R^5$, x and y have the meanings reported above, with water, at a molar ratio between said organometallic aluminium compound and said water ranging from 1:1 to 100:1; preferably from 1:1 to 50:1, and even more preferably, at a Al/H$_2$O molar ratio of about 2.

The compounds of formula (II), as reported above, may be prepared according to methods known in the state of the art. For instance, they may be prepared by reacting an alkene of formula $CH_2=C(Ar)R^4R^5$, wherein Ar, $R^4$ and $R^5$ have the meanings reported above, with an aluminium compound of formula $AlR'_3$, wherein R' is hydrogen or a lower alkyl radical containing a β-hydrogen substituent; suitable $AlR'_3$ compounds are triisobutylaluminium and diisobutylaluminium hydride.

The components (A), (B) and (C) of the catalysts of the present invention can be brought into contact by other methods known in the state of the art, such as by first contacting said organometallic aluminium compound with said metallocene complex and, thereafter, with water.

According to an embodiment of the invention, water can be gradually added to said organometallic aluminium compound in solution, in an aliphatic or aromatic inert hydrocarbon solvent, such as heptane or toluene. Thereafter, the thus obtained solution is contacted with a solution of said metallocene complex in a suitable solvent, such as toluene.

According to another embodiment of the invention, water can be introduced in the monomer or in one of the monomers to be polymerized. In this case, said organometallic aluminium compound and said metallocene complex are pre-contacted before being used in the polymerization.

According to another embodiment of the invention, water can be reacted in a combined form as a hydrated salt, or it can be adsorbed or absorbed on an inert support such as silica.

According to a further embodiment, said organometallic aluminium compound can be allowed to react with boric anhydride and with boric acid.

The catalyst system of the invention may be formed prior to its introduction into a polymerization reactor or in situ in the reactor, by contacting the above-described components.

According to a further embodiment, the catalyst system of the present invention is prepared according to the process described in the International Patent Application WO 99/21896, by pre-alkylating the metallocene complex (A) with an organometallic aluminium compound.

According to a preferred embodiment, the catalyst system of the invention is obtained by first contacting a metallocene complex of formula (I), as reported above, with one or more organometallic aluminium compounds of formula (IV):

$$AlR^{11}{}_{3-z}H_z \tag{IV}$$

wherein $R^{11}$ is a linear or branched, saturated or unsaturated, $C_1$–$C_{10}$ alkyl, $C_6$–$C_{20}$ aryl, $C_7$–$C_{20}$ arylalkyl or $C_7$–$C_{20}$ alkylaryl and z is 0 or 1; according to a preferred embodiment, said metallocene complex of formula (I) is first contacted with a mixture of two organometallic aluminium compounds of formula (IV) wherein z=0 and z=1, so that the molar ratio between the hydrogen atoms directly bound to aluminium and aluminium atoms is higher than 0.02. Examples of $R^{11}$ substituents include 2,4,4-trimethyl-pentyl, 2,3,3-trimethyl-butyl and 2,3-dimethyl.

Subsequently the thus obtained mixture is contacted with (B'), i.e. the product of the reaction between an organometallic aluminium compound of formula (II), as reported above, and water.

The catalysts of the present invention can be used on inert supports. This may be achieved by depositing said metallocene complex, or the product of the reaction thereof with the aluminium compound pre-reacted with water, or said organometallic aluminium compound pre-reacted with water and subsequently said metallocene complex, on inert supports such as silica, alumina, styrene/divinylbenzene copolymers, polyethylene or polypropylene.

The thus obtained solid compound, together with further addition of said organometallic aluminium compound, either as such or pre-reacted with water, can be suitably used in gas phase polymerization.

The catalysts of the present invention can be used in the polymerization reactions of olefins. Therefore, according to further object, the invention provides a process for the polymerization of one or more olefins in the presence of a catalyst system as described above. Olefins which can be polymerized with the process of the present invention are, for instance, α-olefins of formula $CH_2=CHR$, wherein R is hydrogen or a $C_1$–$C_{20}$ alkyl radical.

The catalysts according to the present invention can be conveniently used in the homopolymerization of ethylene, in particular for the preparation of HDPE, and in the copolymerization of ethylene, in particular for the preparation of LLDPE. Suitable comonomers in ethylene copolymers are α-olefins of formula $CH_2=CHR'$, wherein R' is a linear, branched or cyclic $C_1$–$C_{20}$ alkyl radical, and cycloolefins. Examples of such olefins are propylene, 1-butene, 1-pentene, 4-methyl-1-pentene, 1-hexene, 1-octene, allyl-cyclohexane, cyclopentene, cyclohexene, norbornene and 4,6-dimethyl-1-heptene.

Further suitable comonomers in said ethylene copolymers are polyenes, in particular conjugated or non-conjugated, linear or cyclic dienes, such as 1,4-hexadiene, isoprene, 1,3-butadiene, 1,5-hexadiene and 1,6-heptadiene.

The catalysts of the invention can be suitably used in propylene homopolymerization, in particular for the production of isotactic polypropylene.

Moreover, the catalysts of the invention can be suitably used in the preparation of elastomeric copolymers of ethylene with α-olefins of formula $CH_2=CHR$, wherein R is a $C_1–C_{10}$ alkyl radical, such as propylene, 1-butene, 4-methyl-1-pentene, 1-hexene and 1-octene.; said copolymer may optionally contain minor proportions of units deriving from polyenes.

According to a further embodiment, the catalysts according to the present invention are used in the preparation of cycloolefin polymers. Monocyclic and polycyclic olefin monomers can be either homopolymerized or copolymerized, also with linear olefin monomers. Non limiting examples of cycloolefin polymers which can be prepared with the catalyst of the present invention are described in the European patent applications EP 0 501 370 and EP 0 407 870.

The polymerization processes of the present invention can be carried out in liquid phase, optionally in the presence of an inert hydrocarbon solvent, or in gas phase. Said hydrocarbon solvent can be either aromatic (such as toluene) or aliphatic (such as propane, hexane, heptane, isobutane, cyclohexane and 2,2,4-trimethylpentane).

The polymerization temperature preferably ranges from 0° C. to 250° C.; in the preparation of HDPE and LLDPE, it is preferably comprised between 20° C. and 150° C. and, more particularly between 40° C. and 90° C.; in the preparation of elastomeric copolymers, it is preferably comprised between 0° C. and 200° C., and more preferably between 20° C. and 100° C. The catalyst systems according to the invention have the advantage of maintaining very high activity also when relatively high polymerization temperatures are used.

The molecular weight of the (co)polymers can be varied simply by varying the polymerization temperature, the type or the concentration of the catalyst components, or by using molecular weight regulators, such as hydrogen.

The molecular weight distribution can be varied by using mixtures of different metallocene complexes or by carrying out the polymerization in several stages which differ in the polymerization temperature and/or the concentrations of molecular weight regulator.

The polymerization yield depends on the purity of the metallocene complex (A) in the catalyst, therefore, said metallocene complex can be used as such or can be subjected to purification treatments before use.

Particularly interesting results are obtained when the components of the catalyst of the invention are contacted among them before the polymerization. The contact time is preferably comprised between 1 and 60 minutes, more preferably between 5 and 20 minutes. The precontact concentrations for the metallocene complex are comprised between $10^{-2}$ and $10^{-8}$ mol/l, while for the product of the reaction between the organometallic aluminium compound and water they are comprised between 10 and $10^{-3}$ mol/l. The precontact is preferably carried out in the presence of a hydrocarbon solvent and, optionally, of small amounts of monomer.

The following examples are given for illustrative and not limiting purposes.

SYNTHESIS OF METALLOCENE COMPLEXES rac-Ethylene-bis(1-indenyl)zirconium dichloride rac-Et(1-Ind)$_2$ZrCl$_2$ The metallocene complex was prepared according to the procedure described in EP-A-575,875.

rac-Dimethylsilyl-bis(2-methyl-1-indenyl)zirconium dichloride rac-Me$_2$Si(2-Me-1-Ind)$_2$ZrCl$_2$ The metallocene complex was obtained from Boulder Scientific Company as the 97% rac isomer and was used without further purification.

rac-Methylene-bis(3-t-butyl-1-indenyl)zirconium dichloride rac-CH$_2$(3-tBu-1-Ind)$_2$ZrCl$_2$ The metallocene complex was prepared as described in Synthesis 1 of the International Patent Application WO 98/43989.

rac-Dimethylsilyl-bis(2-methyl-benzoindenyl)zirconium dichloride

Me$_2$Si(2-Me-Benzind)$_2$ZrCl$_2$

The metallocene complex was prepared as described in Example A of the U.S. Pat. No. 5,455,366.

SYNTHESIS OF ORGANOALUMINIUM COMPOUNDS

General Procedure

All reactions were carried out under nitrogen in the glove box or under Schlenk conditions using oven-dried glassware. The toluene solvent was dried over 4 Å molecular sieves. All alkenes were dried over 4 Å molecular sieves prior to use.

Tris(2-phenyl-propyl)aluminium—Al(CH$_2$CHMePh)$_3$

In a glove box, o-methyl-styrene (283 g, 2.3 mol; Aldrich, dried over sieves) was dissolved in dry toluene (ca. 300 ml) in a 1 L 3-neck flask. Al{CH$_2$CHMe$_2$}$_3$ (TIBA, 100 ml, 0.395 mmol, ex-Witco) was added over 10 min by syringe to the rapidly stirred solution at ambient temperature. The reaction flask was removed from the glove box and a reflux condenser and nitrogen line attached in the fume hood. The isobutene product was collected using a graduated collection vessel immersed in a −78° C. acetone/dry ice bath. The reaction mixture was warmed over 90 minutes to an internal temperature of 110.7° C. The reaction was allowed to reflux for 16 hours (final reflux temperature 126.4° C.), affording ca. 100% of the theoretical maximum yield of isobutene (ca. 3.0 equivalents/Al). The remaining olefin and solvent were removed in vacuo (50° C., 0.05 mbar, 90 min) utilizing a dry ice/acetone bath to give 162 g of tris(2-phenyl-propyl)aluminium.

Tris[2-(4-fluoro-phenyl)-propyl]aluminium—Al[CH$_2$CHMe(4-F-C$_6$H$_4$)]$_3$

In the glove box, 2-(4-fluoro-phenyl)-propylene (65.1 g, 0.48 mol; Acros, dried over sieves) was dissolved in dry toluene (ca. 70 ml) in a 250 ml 3-neck flask. Al{CH$_2$CHMe$_2$}$_3$ (TIBA, 27.9 ml, 0.120 mol, ex-Witco) was added over 10 min by syringe to the rapidly stirred solution. The reaction flask was removed from the glove box and a reflux condenser and nitrogen line attached in the fume hood. The isobutene product was collected using a graduated collection vessel immersed in a −78° C. acetone/dry ice bath. The reaction mixture was warmed over 90 minutes to an internal temperature of 119.6° C. The reaction was allowed to reflux for 16 hours (final reflux temperature 123.5° C.), affording ca. 100% of the theoretical maximum yield of isobutene. The remaining olefin and solvent were removed in vacuo (60° C., 0.05 mbar, 90 min) utilizing a dry ice/acetone bath to give 50 g of tris[2-(4-fluoro-phenyl)-propyl]aluminium.

Tris[2-(4-chloro-phenyl)-propyl]aluminium—Al[CH$_2$CHMe(4-Cl-C$_6$H$_4$)]$_3$

In the glove box, 2-(4-chloro-phenyl)-propylene (73.2 g, 0.48 mol; Acros, dried over sieves) was dissolved in dry toluene (ca. 80 ml) in a 250 ml 3-neck flask. Al{CH$_2$CHMe$_2$}$_3$ (TIBA, 30.0 ml, 0.128 mol, ex-Witco) was added over 10 min by syringe to the rapidly stirred solution. The reaction flask was removed from the glove box and a reflux condenser and nitrogen line attached in the fume hood. The isobutene product was collected using a graduated collection vessel immersed in a −78° C. acetone/dry ice bath. The reaction mixture was warmed over 90 minutes to an internal temperature of 123.4° C. The reaction was allowed to reflux for 18 hours (final reflux temperature 124.4° C.), affording ca. 100% of the theoretical maximum yield of isobutene. The remaining olefin and solvent were removed in vacuo (60° C., 0.05 mbar, 90 min) utilizing a dry ice/acetone bath to give 62 g of tris[2-(4-chloro-phenyl)-propyl]aluminium.

Tris[2-(4-methyl-phenyl)-propyl]aluminium—Al[CH$_2$CHMe(4-Me-C$_6$H$_4$)]$_3$

In the glove box, 2-(4-methyl-phenyl)-propylene (39.5 g, 0.299 mol) was dissolved in dry toluene (ca. 45 ml) in a 250 ml 3-neck flask. Al{CH$_2$CHMe$_2$}$_3$ (TIBA, 18.7 ml, 0.080 mol, ex-Witco; Aldrich, dried over sieves) was added over 10 min by syringe to the rapidly stirred solution. The reaction flask was removed from the glove box and a reflux condenser and nitrogen line attached in the fume hood. The isobutene product was collected using a graduated collection vessel immersed in a −78° C. acetone/dry ice bath. The reaction mixture was warmed over 60 minutes to an internal temperature of 124.3° C. The reaction was allowed to reflux for 20 h (final reflux temperature 125.4° C.), affording ca. 100% of the theoretical maximum yield of isobutene. The remaining olefin and solvent were removed in vacuo (60° C., 0.05 mbar, 90 min) utilizing a dry ice/acetone bath to give 30 g of tris[2-(4-methyl-phenyl)-propyl]aluminium.

Tris[2-(4-isopropyl-phenyl)-propyl]aluminium—Al[CH$_2$CHMe(4-iPr-C$_6$H$_4$)]$_3$ In the glove box, 2-(4-isopropyl-phenyl)-propylene (27.5 g, 0.172 mol) was dissolved in dry toluene (ca. 35 ml) in a 500 ml 3-neck flask. Al{CH$_2$CHMe$_2$}$_3$ (TIBA, 10.8 ml, 0.046 mol, ex-Witco) was added over 10 min by syringe to the rapidly stirred solution. The reaction flask was removed from the glove box and a reflux condenser and nitrogen line attached in the fume hood. The isobutene product was collected using a graduated collection vessel immersed in a −78° C. acetone/dry ice bath. The reaction mixture was warmed over 90 minutes to an internal temperature of 125.6° C. The reaction was allowed to reflux for 20 h (final reflux temperature 131.8° C.), affording ca. 100% of the theoretical maximum yield of isobutene. The remaining olefin and solvent were removed in vacuo (75° C., 0.05 mbar, 90 min) utilizing a dry ice/acetone bath to give 25 g of tris[2-(4-isopropyl-phenyl)-propyl]aluminium.

Tris[2-(3-isopropyl-phenyl)-propyl]aluminium—Al[CH$_2$CHMe(3-iPr-C$_6$H$_4$)]$_3$ In the glove box, 2-(3-isopropyl-phenyl)-propylene (43.2 g, 0.27 mol; Chemsampco, dried over sieves) was dissolved in dry toluene (ca. 50 ml) in a 250 ml 3-neck flask. Al{CH$_2$CHMe$_2$}$_3$ (TIBA, 17.0 ml, 0.068 mol, ex-Witco) was added over 10 min by syringe to the rapidly stirred solution. The reaction flask was removed from the glove box and a reflux condenser and nitrogen line attached in the fume hood. The isobutene product was collected using a graduated collection vessel immersed in a −78° C. acetone/dry ice bath. The reaction mixture was warmed over 60 minutes to an internal temperature of 124.1° C. The reaction was allowed to reflux for 16 h (final reflux temperature 125.4° C.), affording ca. 100% of the theoretical maximum yield of isobutene. Despite the low boiling point of CH$_2$=C(Me)(CMe$_3$), only a negligible amount of this olefin was collected in the cold trap. The remaining olefin and solvent were removed in vacuo 75° C., 0.05 mbar, 90 min) utilizing a dry ice/acetone bath to give 32 g of tris[2-(3-isopropyl-phenyl)-propyl]aluminium.

Tris(2,3-dimethyl-butyl)aluminium

The aluminium compound was prepared as described in the International Patent Application WO 99/21899.

Tris(2,4,4-trimethyl-pentyl)aluminium (TIOA)

The aluminium compound was prepared according to the method described in Liebigs Ann. Chem., Volume 629, 1960, Ziegler et al. "Aluminiumtrialkyle und Dialkyl-aluminiumhydride aus Aluminiumisobutyl-Verbindungen [Aluminium trialkyls and dialkyl-aluminium hydrides from aluminium isobutyl compounds]", pages 14 –19.

Tris[2-(2-naphthyl)-propyl]aluminium—Al{CH2CHMe(Naphthyl)}3

In a glove box, 2-isopropenylnaphthalene (20.3 g, 121 mmol; TCI-US, evacuated for 2 h at 50° C.) was dissolved in dry toluene (ca. 30 ml) in a 250 mL 3-neck flask. Al{CH2CHMe2}3 (TIBA, 7.23 g, 36.5 mmol, AKZO) was added by syringe to the rapidly stirred solution at ambient temperature. The reaction flask was removed from the glove box and a reflux condenser and nitrogen line attached in the fume hood. The isobutene product was collected using a graduated collection vessel immersed in a −78° C. acetone/dry ice bath. The reaction mixture was warmed over 20 minutes to an internal temperature of 120° C. The reaction was allowed to reflux for 16 hours (final reflux temperature 120° C.), affording ca. 100% of the theoretical maximum yield of isobutene (ca. 3.0 equivalents/Al). The solvent was removed in vacuo (60° C., 0.03 mbar, 120 min) utilizing a dry ice/acetone bath to give 19.3 g of tris[2-(2-naphthyl)-propyl]aluminium, containing ca. 10 w/w % 2-isopropenyl-naphthalene, as determined by 1H NMR spectroscopy.

Methylalumoxane (MAO)

The product available from Witco as a 10% w/w solution in toluene was used.

Tris(2-methyl-propyl)aluminium (TIBA)

The product available from Witco was used.

POLYMERIZATION

EXAMPLES 1–3

A 5 liters reactor equipped with turbine stirrer, steam/water temperature control and a catalyst injection system was heated to 150–160° C. overnight, whilst purging with nitrogen, cooled and then pickled at 70° C. using a mixture of TIBA (0.25 g), toluene (20 ml) and propylene (500 g). The pickle mixture was removed and the reactor then charged with 1650 g liquid propylene, whilst increasing the temperature from 20° C. to 50° C.

Separately, 3.46 g of Tris(2-phenyl-propyl)aluminium Al(CH$_2$CHMePh)$_3$ (9 mmol) were dissolved in 20 g of toluene in a bottle with a septum cap. The solution was cooled to 0–4° C. using an ice bath, and 81 microliter of water (4.5 mmol) added in four shots using a 25 microliter syringe, whilst maintaining the temperature below 15° C. and purging the solution with nitrogen. The resulting solution was introduced into the reactor using an injection system, washed in using 20 ml of toluene.

Meanwhile, 10.1 mg of rac-Et(1-Ind)$_2$ZrCl$_2$ (24 micromol) was dissolved in 15.7 g of toluene, and 0.65 g of the obtained solution was reacted with 0.11 g TIOA (0.3 mmol), resulting in a color change from yellow to light yellow. Ten minutes after the introduction of the hydrolyzed alkylaluminium mixture into the reactor, the alkylated zirconocene solution (aged for 5 minutes) was injected into the reactor (using 20 ml toluene). The polymerization was continued for 1 hour, at the temperature reported in table 1, using 840–1100 rpm stirring; in Example 3, moreover, hydrogen was added during the polymerization (0.05% v of the gascap). The polymerization was then stopped by injection of 5–10 ml methanol. The heating was then discontinued and the propylene rapidly vented and the powder polypropylene collected. Fouled material was removed using hot toluene and precipitated with methanol. The polypropylene fractions were dried (70–80° C., 200 mbar, nitrogen purge) and combined to give the total yield of polypropylene.

The polymerization conditions and the data relating to the obtained polymers are indicated in Table 1.

COMPARATIVE EXAMPLES 1 AND 2

The general procedure described in Example 1 was followed, but using MAO instead of Al(CH$_2$CHMePh)$_3$ and instead of TIOA, and operating with the amounts of metallocene and aluminium compound indicated in Table 1; in comparative Example 2, moreover, hydrogen was added during the polymerization (0.05% v of the gascap); the polymerization conditions and the data relating to the obtained polymer are indicated in Table 1.

COMPARATIVE EXAMPLES 3 AND 4

The general procedure described in Example 1 was followed, but using tris(2,3-dimethyl-butyl)aluminium instead of Al(CH$_2$CHMePh)$_3$ and instead of TIOA, and using the amounts of metallocene and aluminium compound indicated in Table 1 (Al/H$_2$O molar ratio 2/1 during alumoxane preparation); the polymerization was carried out at 50° C. and 70° C. respectively. The polymerization conditions and the data relating to the obtained polymer are indicated in Table 1.

EXAMPLES 4 AND 5

The general procedure described in Example 1 was followed, but using Al[CH$_2$CHMe(4-F-C$_6$H$_4$)]$_3$ as aluminium compound instead of Al(CH$_2$CHMePh)$_3$ and using the amounts of metallocene and aluminium compound indicated in Table 1 (Al/H$_2$O molar ratio 2/1 during alumoxane preparation). The polymerization conditions and the data relating to the obtained polymers are indicated in Table 1.

EXAMPLE 6

The general procedure described in Example 1 was followed, but using Al[CH$_2$CHMe(4-Cl-C$_6$H$_4$)]$_3$ as aluminium compound instead of Al(CH$_2$CHMePh)$_3$ and using the amounts of metallocene and aluminium compound indicated in Table 1 (Al/H$_2$O molar ratio 2/1 during alumoxane preparation). The polymerization conditions and the data relating to the obtained polymer are indicated in Table 1.

EXAMPLE 7

A 5 liters reactor equipped with turbine stirrer, steam/water temperature control and a catalyst injection system was heated to 150–160° C. overnight, whilst purging with nitrogen, cooled and then pickled at 70° C. using a mixture of TIBA (0.25 g), toluene (20 ml) and propylene (500 g). The pickle mixture was removed and the reactor then charged with 1650 g liquid propylene, whilst increasing the temperature from 20° C. to 50° C.

Separately, 1.97 g of Al[CH$_2$CHMe(4-F-C$_6$H$_4$)]$_3$ (4.5 mmol) were dissolved in 20 g of toluene in a bottle with a septum cap. The solution was cooled to 0–4° C. using an ice bath, and 41 microliter of water (2.25 mmol) added in four shots using a 25 microliter syringe, whilst maintaining the temperature below 15° C. and purging the solution with nitrogen. The resulting solution was introduced into the reactor using an injection system, washed in using 20 ml of toluene.

Meanwhile, 9.2 mg of rac-CH$_2$(3-tBu-1-Ind)$_2$ZrCl$_2$ (17.8 micromol) were dissolved in 15.8 g of toluene, and 2.67 g of the obtained solution was reacted with 0.11 g TIOA (0.3 mmol), resulting in a color change from red to pale red. Ten minutes after the introduction of the hydrolyzed alkylaluminium mixture into the reactor, the alkylated zirconocene solution (aged for 5 minutes) was injected into the reactor (using 20 ml toluene). The polymerization was continued for 1 hour, at the temperature of 70° C., using 840–1100 rpm stirring; hydrogen was added during the polymerization (0.07% v of the gascap). The polymerization was then stopped by injection of 5–10 ml methanol. The heating was then discontinued and the propylene rapidly vented and the powder polypropylene collected. Fouled material was removed using hot toluene and precipitated with methanol. The polypropylene fractions were dried (70–80° C., 200 mbar, nitrogen purge) and combined to give the total yield of polypropylene.

The polymerization conditions and the data relating to the obtained polymer are indicated in Table 1.

EXAMPLE 8

A 5 liters reactor equipped with turbine stirred, steam/water temperature control and a catalyst injection system was heated to 150–160° C. overnight, whilst purging with nitrogen, cooled and then pickled at 70° C. using a mixture of TIBA (0.25 g), toluene (20 ml) and propylene (500 g). The pickle mixture was removed and the reactor then charged with 1650 g liquid propylene, whilst increasing the temperature from 20° C. to 50° C.

Separately, 4.37 g of Al[CH$_2$CHMe(4-F-C$_6$H$_4$)]$_3$ (10 mmol) was dissolved in 20 g of toluene in a bottle with a septum cap. The solution was cooled to 0–4° C. using an ice bath, and 81 microliter of water (4.5 mmol) added in four shots using a 25 microliter syringe, whilst maintaining the temperature below 15° C. and purging the solution with nitrogen. The resulting solution was introduced into the reactor using an injection system, washed in using 20 ml of toluene.

Meanwhile, 10.3 mg of rac-Me$_2$Si(2-Me-1-Ind)$_2$ZrCl$_2$ (21.7 micromol) was dissolved in 15.6 g of toluene, and 0.72 g of the obtained solution was reacted with 0.11 g TIOA (0.3 mmol), resulting in a color change from yellow to light yellow. Ten minutes after the introduction of the hydrolyzed alkylaluminium mixture into the reactor, the alkylated zirconocene solution (aged for 5 minutes) was injected into the reactor (using 20 ml toluene). The polymerization was continued for the time reported in Table 1, at the temperature reported in Table 1, using 840–1100 rpm stirring. The polymerization was then stopped by injection of 5–10 ml methanol.

The polymerization conditions and the data relating to the obtained polymers are indicated in Table 1.

EXAMPLE 9

The general procedure described in Example 8 was followed, using the amounts of metallocene and aluminium compound indicated in Table 1 (Al/H$_2$O molar ratio 2/1 during alumoxane preparation); hydrogen was added during the polymerization (0.24% v of the gascap). The polymerization conditions and the data relating to the obtained polymers are indicated in Table 1.

EXAMPLES 10–12

The general procedure described in Example 8 was followed, but using Al[CH$_2$CHMe(4-Cl-C$_6$H$_4$)]$_3$ as aluminium compound instead of Al[CH$_2$CHMe(4-F-C$_6$H$_4$)]$_3$, and using the amounts of metallocene and aluminium compound indicated in Table 1 (Al/H$_2$O molar ratio 2/1 during alumoxane preparation); in Example 12, moreover, hydrogen was added during the polymerization (0.11% v of the gascap). The polymerization conditions and the data relating to the obtained polymers are indicated in Table 1.

COMPARATIVE EXAMPLE 5

The general procedure described in Example 8 was followed, but using MAO as aluminium compound instead of Al[CH$_2$CHMe(4-F-C$_6$H$_4$)]$_3$, and using the amounts of metallocene, and aluminium compound indicated in Table 1; hydrogen was added during the polymerization (0.11% v of the gascap). The polymerization conditions and the data relating to the obtained polymers are indicated in Table 1.

EXAMPLE 13

A 5 liters reactor equipped with turbine stirrer, steam/water temperature control and a catalyst injection system was heated to 150–160° C. overnight, whilst purging with nitrogen, cooled and then pickled at 70° C. using a mixture of TIBA (0.25 g), toluene (20 ml) and propylene (500 g). The pickle mixture was removed and the reactor then charged with 1650 g liquid propylene, whilst increasing the temperature from 20° C. to 30° C. Then 4–5% hydrogen was added to the gascap, aiming at 1–1.5% hydrogen in the gascap at 70° C.

Separately, 2.20 g of tris{2-(4-chlorophenyl)-propyl} Al[CH$_2$CHMe(4-Cl-C$_6$H$_4$)]$_3$ (4.5 mmol) were dissolved in 20 ml of toluene in a bottle with a septum cap. The solution was cooled to 0–4° C. using an ice bath, and 41 microliter of water (2.28 mmol) added in two shots using a 100 microliter syringe, whilst maintaining the temperature below 15° C. The resulting solution was introduced into the reactor using an injection system, washed in using 20 ml of toluene.

Meanwhile, 13 mg of rac-Me$_2$Si(2-Me-Benzind)$_2$ZrCl$_2$ (23 micromol) was dissolved in 22.39 g of toluene by adding 413 mg TIOA (1128 micromol), and 0.05 g of the obtained solution containing 0.05 micromol zirconium complex was reacted with 0.11 g TIOA (0.3 mmol), resulting in a color change from yellow to light yellow. Ten minutes after the introduction of the hydrolyzed alkylaluminium mixture containing 4.5 mmol aluminoxane into the reactor, the alkylated zirconocene solution (aged for 5 minutes) was injected into the reactor (using 20 ml toluene) at a temperature of 30° C. After 0.5 minute the temperature was raised in 6–7 minutes to 70° C. and polymerization was continued for 1 hour, using 840–1100 rpm stirring, keeping the hydrogen concentration at 1% in the gascap. The polymerization was then stopped by injection of 5–10 ml methanol. The heating was then discontinued and the propylene rapidly vented and the powder polypropylene collected. Fouled material was removed using hot xylene and precipitated with methanol. The polypropylene fractions were dried (70–80° C., 200 mbar, nitrogen purge) and combined to give the total yield of polypropylene.

COMPARATIVE EXAMPLE 6

A 5 liters reactor equipped with turbine stirrer, steam/water temperature control and a catalyst injection system was heated to 150–160° C. overnight, whilst purging with nitrogen, cooled and then pickled at 70° C. using a mixture of TIBA (0.25 g), toluene (20 ml) and propylene (500 g). The pickle mixture was removed and the reactor then charged with 1650 g liquid propylene, whilst increasing the temperature from 20° C. to 30° C. Then 4–5% hydrogen was added to the gascap, aiming at 1–1.5% hydrogen in the gascap at 70° C.

Separately, 2.44 g of a toluene solution of MAO containing 4.98% w/w aluminium (4.5 mmol) was introduced into the reactor using an injection system, washed in using 20 ml of toluene..

Meanwhile, 17.1 mg of Me$_2$Si(2-Me-Benzind)$_2$ZrCl$_2$ (30 micromol) was dissolved in 16.46 g of toluene by adding 138 mg MAO solution (250 micromol), and 0.745 g of the obtained solution containing 0.05 micromol zirconium complex was reacted with 405 mg of the MAO solution (0.75 mmol), resulting in a color change from yellow to red. Ten minutes after the introduction of the solution containing 4.5 mmol MAO into the reactor, the alkylated zirconocene solution (aged for 5 minutes) was injected into the reactor (using 20 ml toluene) at a temperature of 30° C. After 0.5 minute the temperature was raised in 6–7 minutes to 70° C. and polymerization was continued for 1 hour, using 840–1100 rpm stirring, keeping the hydrogen concentration at 1% in the gascap. The polymerization was then stopped by injection of 5–10 ml methanol. The heating was then discontinued and the propylene rapidly vented and the powder polypropylene collected. Fouled material was removed using hot xylene and precipitated with methanol. The polypropylene fractions were dried (70–80° C., 200 mbar, nitrogen purge) and combined to give the total yield of polypropylene.

TABLE 1

| Example | Metallocene | (micromol) | Prealkylating agent | (mmol) |
|---|---|---|---|---|
| 1 | rac-Et(1-lnd)$_2$ZrCl$_2$ | 1 | TIOA | 0.3 |
| 2 | rac-Et(1-lnd)$_2$ZrCl$_2$ | 1 | TIOA | 0.3 |
| 3* | rac-Et(1-lnd)$_2$ZrCl$_2$ | 1 | TIOA | 0.3 |
| Comp. 1 | rac-Et(1-lnd)$_2$ZrCl$_2$ | 1 | MAO | 0.5 |
| Comp. 2* | rac-Et(1-lnd)$_2$ZrCl$_2$ | 1 | MAO | 0.5 |
| Comp. 3 | rac-Et(1-lnd)$_2$ZrCl$_2$ | 2 | Al(CH$_2$CHMeCHMe$_2$)$_3$ | 0.3 |
| Comp. 4 | rac-Et(1-lnd)$_2$ZrCl$_2$ | 2 | Al(CH$_2$CHMeCHMe$_2$)$_3$ | 0.3 |
| 4 | rac-Et(1-lnd)$_2$ZrCl$_2$ | 0.5 | TIOA | 0.2 |
| 5 | rac-Et(1-lnd)$_2$ZrCl$_2$ | 0.5 | TIOA | 0.2 |
| 6 | rac-Et(1-lnd)$_2$ZrCl$_2$ | 0.5 | TIOA | 0.3 |
| 7* | rac-CH$_2$(3-tBu-1-lnd)$_2$ZrCl$_2$ | 3 | TIOA | 0.3 |
| 8 | rac-Me$_2$Si(2-Me-1-lnd)$_2$ZrCl$_2$ | 1 | TIOA | 0.3 |
| 9* | rac-Me$_2$Si(2-Me-1-lnd)$_2$ZrCl$_2$ | 0.5 | TIOA | 0.3 |
| 10 | rac-Me$_2$Si(2-Me-1-lnd)$_2$ZrCl$_2$ | 0.25 | TIOA | 0.3 |
| 11 | rac-Me$_2$Si(2-Me-1-lnd)$_2$ZrCl$_2$ | 0.25 | TIOA | 0.3 |
| 12* | rac-Me$_2$Si(2-Me-1-lnd)$_2$ZrCl$_2$ | 0.5 | TIOA | 0.3 |
| Comp. 5* | rac-Me$_2$Si(2-Me-1-lnd)$_2$ZrCl$_2$ | 0.5 | TIOA | 0.3 |
| 13 | rac-Me2Si(2-Me-Benzind)2ZrCl2 | 0.05 | TIOA | 0.3 |
| Comp. 6 | rac-Me2Si(2-Me-Benzind)2ZrCl2 | 0.05 | MAO | 0.75 |

| Example | Cocatalyst | (mmol) | Total Al/Zr (mol/mol) | T(° C.) | Yield (g pol.) | Time (min) | Activity (kg/g Zr/h) |
|---|---|---|---|---|---|---|---|
| 1 | Al(CH$_2$CHMePh)$_3$ | 9 | 9300 | 50 | 615 | 31 | 3530 |
| 2 | Al(CH$_2$CHMePh)$_3$ | 9 | 9300 | 70 | 450 | 60 | 4930 |
| 3* | Al(CH$_2$CHMePh)$_3$ | 9 | 9300 | 70 | 601 | 61 | 6480 |
| Comp. 1 | MAO | 8.8 | 9300 | 70 | 392 | 60 | 4300 |
| Comp. 2* | MAO | 9 | 9540 | 70 | 562 | 61 | 6060 |
| Comp. 3 | Al(CH$_2$CHMeCHMe$_2$)$_3$ | 9 | 4650 | 50 | 432 | 60 | 2470 |
| Comp. 4 | Al(CH$_2$CHMeCHMe$_2$)$_3$ | 9 | 4650 | 70 | 152 | 60 | 830 |
| 4 | Al[CH$_2$CHMe(4-F—C$_6$H$_4$)]$_3$ | 9 | 18400 | 50 | 395 | 60 | 8660 |
| 5 | Al[CH$_2$CHMe(4-F—C$_6$H$_4$)]$_3$ | 9 | 18400 | 70 | 455 | 61 | 9810 |
| 6 | Al[CH$_2$CHMe(4-Cl—C$_6$H$_4$)]$_3$ | 9 | 18470 | 70 | 287 | 60 | 6290 |
| 7* | Al[CH$_2$CHMe(4-F—C$_6$H$_4$)]$_3$ | 4.5 | 1600 | 70 | 160 | 60 | 580 |
| 8 | Al[CH$_2$CHMe(4-F—C$_6$H$_4$)]$_3$ | 10 | 10300 | 70 | 135** | 10 | 8880** |
| 9* | Al[CH$_2$CHMe(4-F—C$_6$H$_4$)]$_3$ | 2 | 4600 | 70 | 239 | 41 | 7670 |
| 10 | Al[CH$_2$CHMe(4-Cl—C$_6$H$_4$)]$_3$ | 4.5 | 19200 | 50 | 113 | 60 | 4960 |
| 11 | Al[CH$_2$CHMe(4-Cl—C$_6$H$_4$)]$_3$ | 4.5 | 19200 | 70 | 283 | 60 | 12400 |
| 12* | Al[CH$_2$CHMe(4-Cl—C$_6$H$_4$)]$_3$ | 2 | 4600 | 70 | 236* | 30 | 10350** |
| Comp. 5* | MAO | 2 | 4600 | 70 | 79 | 25 | 4160 |
| 13 | Al[CH$_2$CHMe(4-Cl—C$_6$H$_4$)]$_3$ | 4.5 | 90000 | 70 | | 60 | 34900 |
| Comp. 6 | MAO | 4.5 | 90010 | 70 | | 60 | 30700 |

*Hydrogen added during polymerization
**Calculated yield and activity (based on propene conversion)

The invention claimed is:

1. A catalyst system for polymerizing olefins comprising a product obtained by contacting:

(A) a metallocene complex of formula (I):

(Cp)(ZR$^1_m$)$_n$(A)$_r$ML$_p$      (I)

wherein (ZR$^1_m$)$_n$ is a divalent group bridging Cp and A;

Z is selected from C, Si, Ge, N or P;

R$^1$ being equal or different from each other, is selected from hydrogen or a linear or branched, saturated or unsaturated C$_1$–C$_{20}$ alkyl, C$_3$–C$_{20}$ cycloalkyl, C$_6$–C$_{20}$ aryl, C$_7$–C$_{20}$ alkylaryl, C$_7$–C$_{20}$ arylalkyl and combinations thereof;

Cp is a substituted or unsubstituted cyclopentadienyl group, optionally condensed to one or more substituted or unsubstituted, saturated, unsaturated or aromatic rings, containing from 4 to 6 carbon atoms, optionally containing one or more heteroatoms;

A is selected from —O—, —S—, or —N(R$^2$)—, wherein R$^2$ is selected from hydrogen, a linear or branched, saturated or unsaturated C$_1$–C$_{20}$ alkyl, C$_3$–C$_{20}$ cycloalkyl, C$_6$–C$_{20}$ aryl, C$_7$–C$_{20}$ alkylaryl or C$_7$–C$_{20}$ arylalkyl, or A is Cp;

M is selected from a transition metal belonging to group 3, 4, 5, or 6, or a lanthanide or actinide metal of the Periodic Table;

L being equal or different from each other, is a monoanionic sigma ligand selected from the group consisting of hydrogen, halogen, —R$^3$, —OR$^3$, —OCOR$^3$, —SR$^3$, —NR$^3_2$, —PR$^3_2$ and combinations thereof, wherein R$^3$ is selected from a linear or branched, saturated or unsaturated C$_1$–C$_{20}$ alkyl, C$_3$–C$_{20}$ cycloalkyl, C$_6$–C$_{20}$ aryl, C$_7$–C$_{20}$ alkylaryl, C$_7$–C$_{20}$ arylalkyl and combinations thereof, wherein R$^3$ optionally contains one or more Si or Ge atoms;

m is 1 or 2;

n is an integer ranging from 0 to 4;

r is 0 or 1, with the proviso that n is 0 when r is 0;

p is an integer equal to an oxidation state of M minus 2 when r=1, and minus 1 when r=0, and ranges from 1 to 4;

(B) an organometallic aluminum compound of formula (II):

Al[CH$_2$—C(Ar)R$^4$R$^5$]$_x$H$_y$      (II)

wherein Ar is a substituted aryl group corresponding to formula (III):

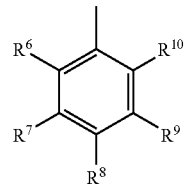
(III)

wherein $R^6$, $R^8$ and $R^{10}$ are selected from the group consisting of hydrogen, halogen, —C(O)$R^3$, —O$R^3$, —S$R^3$, —N$R^3_2$ and —NO$_2$;

$R^7$ and $R^9$ are selected from the group consisting of hydrogen, halogen, $C_6$–$C_{20}$ aryl, $C_7$–$C_{20}$ alkylaryl and $C_7$–$C_{20}$ arylalkyl, wherein $R^7$ and $R^9$ optionally contain one or more Si or Ge atoms; two adjacent substituents $R^6$–$R^{10}$ optionally form a ring, having 3 to 8 carbon atoms; with the proviso that Ar is not an unsubstituted phenyl;

$R^4$ is selected from a linear or branched, saturated or unsaturated, $C_1$–$C_{10}$ alkyl, $C_6$–$C_{20}$ aryl, $C_7$–$C_{20}$ arylalkyl or $C_7$–$C_{20}$ alkylaryl;

$R^5$ is selected from hydrogen or a linear or branched, saturated or unsaturated, $C_1$–$C_{10}$ alkyl, $C_6$–$C_{20}$ aryl, $C_7$–$C_{20}$ arylalkyl or $C_7$–$C_{20}$ alkylaryl; $R^4$ and $R^5$ optionally form a ring, having 3 to 8 carbon atoms; a carbon atom in the compound of formula (II) being optionally replaced by a Si or a Ge atom;

x is 2 or 3;

y=3 minus x; and (C) water;

wherein a molar ratio between the organometallic aluminium compound (B) and the water (C) is between 1:1 and 100:1.

2. The catalyst system according to claim 1, wherein the molar ratio is about 2:1.

3. The catalyst system according to claim 1, wherein a molar ratio between the organometallic aluminium compound (B) and the metallocene complex (A) ranges from 50:1 to 50,000:1.

4. The catalyst system according to claim 1, wherein M is selected from Ti, Zr or Hf.

5. The catalyst system according to claim 1, wherein the divalent group $(ZR^1_m)_n$ is selected from the group consisting of $CR^1_2$, $(CR^1_2)_2$, $(CR^1_2)_3$, $SiR^1_2$, $GeR^1_2$, $NR^1$ and $PR^1$, $R^1$ has the same meaning as in claim 1.

6. The catalyst system according to claim 5, wherein the divalent group $(ZR^1_m)_n$ is selected from the group consisting of $Si(CH_3)_2$, $SiPh_2$, $CH_2$, $(CH_2)_2$, $(CH_2)_3$ and $C(CH_3)_2$.

7. The catalyst system according to claim 1, wherein Cp is selected from the group consisting of cyclopentadienyl; mono-, di-, tri- and tetra-methyl cyclopentadienyl; 4-'butyl-cyclopentadienyl; 4-adamantyl-cyclopentadienyl; indenyl; mono-, di-, tri- and tetra-methyl indenyl; 3-'butyl-indenyl; 3-trimethylsilyl-indenyl; 4,5,6,7-tetrahydroindenyl; fluorenyl; 5,10-dihydroindeno[1,2-b]indol-10-yl; N-methyl- or N-phenyl-5,10-dihydroindeno[1,2-b]indol-10-yl; 5,6-dihydroindeno[2,1-b]indol-6-yl; N-methyl- or N-phenyl-5,6-dihydroindeno[2,1-b]indol-6-yl; azapentalene-4-yl; thiapentalene-4-yl; azapentalene-6-yl; thiapentalene-6-yl; and mono-, di- and tri-methyl-azapentalene-4-yl.

8. The catalyst system according to claim 1, wherein L is selected from the group consisting of —Cl, —Br, —Me, —Et, —n—Bu, —sec—Bu, —Ph, —Bz, —CH$_2$SiMe$_3$, —OEt, —OPr, —OBu, —OBz and —NMe$_2$.

9. The catalyst system according to claim 1, wherein Ar is selected from the group consisting of 4-fluoro-phenyl, 4-chloro-phenyl, 4-methoxyphenyl, 4-nitrophenyl, 2,4-difluorophenyl, 2,4-dichlorophenyl, 2,6-difluorophenyl, 2,6-dichlorophenyl, 3,5-difluorophenyl, 3,5-dichlorophenyl, 2,4,6-trifluorophenyl, 2,4,6-trichlorophenyl, 3,4,5-trifluorophenyl, 3,4,5-trichlorophenyl, pentafluorophenyl and pentachlorophenyl.

10. The catalyst system according to claim 1, wherein the organometallic aluminium compound of formula (II) is selected from the group consisting of tris[2-(4-fluoro-phenyl)-propyl]aluminium, tris[2-(4-chloro-phenyl)-propyl]aluminium, and tris[2-(pentafluorophenyl)-propyl]aluminium.

11. A catalyst system for polymerizing olefins comprising a product obtained by contacting:

(A) a metallocene complex of formula (I):

$$(Cp)(ZR^1_m)_n(A)_rML_p \qquad (I)$$

wherein M, Cp, $(ZR^1_m)_n$, A, L, r and p have the same meanings as in claim 1; and (B') a product of a reaction between water and an organometallic aluminium compound of formula (II):

$$Al[CH_2\text{—}C(Ar)R^4R^5]_xH_y \qquad (II)$$

wherein Ar, $R^4$, $R^5$, x and y have the same meanings as in claim 1;

wherein a molar ratio between the organometallic aluminium compound and the water is between 1:1 and 100:1.

12. The catalyst system according to claim 1, wherein the metallocene complex is pre-alkylated with at least one organometallic aluminium compound of formula (IV):

$$AlR^{11}_{3-z}H_z \qquad (IV)$$

wherein $R^{11}$ is selected from a linear or branched, saturated or unsaturated, $C_1$–$C_{10}$ alkyl, $C_6$–$C_{20}$ aryl, $C_7$–$C_{20}$ arylalkyl, $C_7$–$C_{20}$ alkylaryl and combination thereof; and z is 0 or 1.

13. An alumoxane obtained by contacting an organometallic aluminium compound of formula (II)

$$Al[CH_2\text{—}C(Ar)R^4R^5]_xH_y \qquad (II)$$

wherein Ar, $R^4$, $R^5$, x and y have the same meanings as in claim 1, with water, wherein a molar ratio between the organometallic aluminium compound and the water is between 1:1 and 100:1.

14. The catalyst system for polymerizing olefins according to claim 1, wherein the olefins comprise at least one α-olefin of formula CH$_2$=CHR, wherein R is hydrogen or a $C_1$–$C_{20}$ alkyl radical.

15. The catalyst system for polymerizing olefins according to claim 14, wherein said α-olefin is selected from the group consisting of propylene, 1-butene, 4-methyl-1-pentene, 1-hexene and 1-octene.

16. The catalyst system for polymerizing olefins according to claim 1, wherein ethylene is copolymerized with an α-olefin of formula CH$_2$=CHR', wherein R' is selected from a linear, branched or cyclic $C_1$–$C_{20}$ alkyl radical, or with a cyclooloefin, and optionally with a polyene.

17. The catalyst system according to claim 11, wherein the metallocene complex is pre-alkylated with one or more organometalic aluminum compounds of formula (IV):

$$AlR^{11}{}_{3-z}H_z \qquad (IV)$$

wherein $R^{11}$ is selected from a linear or branched, saturated or unsaturated, $C_1$–$C_{10}$ alkyl, $C_6$–$C_{20}$ aryl, $C_7$–$C_{20}$ arylalkyl, $C_7$–$C_{20}$ alkylaryl and combinations thereof; and z is 0 or 1.

18. The catalyst system for polymerizing olefins according to claim 11, wherein the olefins comprise at least one α-olefin of formula $CH_2$=CHR, wherein R is hydrogen or a $C_1$–$C_{20}$ alkyl radical.

19. The catalyst system for polymerizing olefins according to claim 18, wherein said α-olefin is selected from the group consisting of propylene, 1-butene, 4-methyl-1-pentene, 1-hexene and 1-octene.

20. The catalyst system for polymerizing olefins according to claim 11, wherein ethylene is copolymerized with an α-olefin of formula $CH_2$=CHR', wherein R' is selected from a linear, branched or cyclic $C_1$–$C_{20}$ alkyl radical, or with a cycloolefin, and optionally with a polyene.

21. The catalyst system for polymerizing olefins according to claim 12, wherein the olefins comprise at least one α-olefin of formula $CH_2$=CHR, wherein R is hydrogen or a $C_1$–$C_{20}$ alkyl radical.

22. The catalyst system for polymerizing olefins according to claim 21, wherein said α-olefin is selected from the group consisting of propylene, 1-butene, 4-methyl-1-pentene, 1-hexene and 1-octene.

23. The catalyst system for polymerizing olefins according to claim 12, wherein ethylene is copolymerizied with an α-olefin of formula $CH_2$=CHR', wherein R' is selected from a linear, branched or cyclic $C_1$–$C_{20}$ alkyl radical, or with a cycloolefin, and optionally with a polyene.

* * * * *

UNITED STATES PATENT AND TRADEMARK OFFICE
CERTIFICATE OF CORRECTION

PATENT NO. : 7,141,527 B1 Page 1 of 1
APPLICATION NO. : 10/088408
DATED : November 28, 2006
INVENTOR(S) : Jan F. Van Baar et al.

It is certified that error appears in the above-identified patent and that said Letters Patent is hereby corrected as shown below:

At col. 20, line 44, change "combination" to --combinations--

Signed and Sealed this

Third Day of April, 2007

JON W. DUDAS
*Director of the United States Patent and Trademark Office*